United States Patent
Itten et al.

(10) Patent No.: US 10,454,362 B2
(45) Date of Patent: Oct. 22, 2019

(54) CIRCUIT FOR PRE-CHARGING AN INTERMEDIATE CIRCUIT, AND ELECTRIC SYSTEM

(71) Applicant: Schmidhauser AG, Romanshorn (CH)

(72) Inventors: Alex Itten, Romanshorn (CH); Zoltan Docs, Budapest (HU)

(73) Assignee: Schmidhauser AG, Romanshorn (CH)

( * ) Notice: Subject to any disclaimer, the term of this patent is extended or adjusted under 35 U.S.C. 154(b) by 0 days.

(21) Appl. No.: 16/321,216

(22) PCT Filed: Jul. 28, 2017

(86) PCT No.: PCT/EP2017/069202
§ 371 (c)(1),
(2) Date: Jan. 28, 2019

(87) PCT Pub. No.: WO2018/020015
PCT Pub. Date: Feb. 1, 2018

(65) Prior Publication Data
US 2019/0165670 A1 May 30, 2019

(30) Foreign Application Priority Data
Jul. 29, 2016 (DE) .................. 10 2016 214 063

(51) Int. Cl.
*H01J 7/34* (2006.01)
*H02M 1/36* (2007.01)
(Continued)

(52) U.S. Cl.
CPC .............. *H02M 1/36* (2013.01); *H02J 7/345* (2013.01); *H02M 1/32* (2013.01); *B60L 2210/30* (2013.01);
(Continued)

(58) Field of Classification Search
CPC ...... H02M 1/32; H02M 2210/40; H02J 7/345; H02J 7/0065; B60L 2210/30
(Continued)

(56) References Cited

U.S. PATENT DOCUMENTS 8,144,024 B2 * 3/2012 Akimov .............. G01R 31/025
340/636.1
8,310,242 B2 11/2012 Itten et al.
(Continued)

FOREIGN PATENT DOCUMENTS

DE  10 2009 054 823 A1  6/2011
DE  10 2010 030 129 A1  12/2011
(Continued)

OTHER PUBLICATIONS

International Search Report (PCT/ISA/210) issued in PCT Application No. PCT/EP2017/069202 dated Oct. 9, 2017 with English translation (five pages).
(Continued)

*Primary Examiner* — Rajnikant B Patel
(74) *Attorney, Agent, or Firm* — Crowell & Moring LLP

(57) ABSTRACT

A circuit for pre-charging an intermediate circuit having a positive branch and a negative branch includes: a first controllable energy source, a second controllable energy source, the first control energy source and second controllable energy source being looped in series between the positive branch and the negative branch on the output side, a suppression unit, the suppression unit being looped between a connection node of the output of the first controllable energy source and the output of the second controllable energy source and a reference potential, and a controller. The controller is connected to the first energy source and the second energy source for signaling purposes and is configured to actuate the first energy source and the
(Continued)

second energy source in order to generate an output signal pattern in order to pre-charge the intermediate circuit.

14 Claims, 4 Drawing Sheets

(51) Int. Cl.
    *H02M 1/32* (2007.01)
    *H02J 7/34* (2006.01)
(52) U.S. Cl.
    CPC ....... *B60L 2210/40* (2013.01); *B60L 2270/20* (2013.01)
(58) Field of Classification Search
    USPC ............ 307/82, 104; 324/98, 426, 503, 509; 363/37–39, 69
    See application file for complete search history.

(56) References Cited

U.S. PATENT DOCUMENTS

| 9,308,826 B2* | 4/2016 | Garcia-Flores ..... B60L 11/1851 |
| 10,110,035 B2 | 10/2018 | Butzmann |
| 2010/0097031 A1* | 4/2010 | King ..................... H02J 7/0045 320/109 |
| 2012/0306468 A1* | 12/2012 | Butzmann ............ H02J 7/0024 323/304 |
| 2013/0300430 A1* | 11/2013 | Lindsay ................ B60L 3/0007 324/522 |
| 2015/0035360 A1 | 2/2015 | Marbach |

FOREIGN PATENT DOCUMENTS

| DE | 10 2013 223 538 A1 | 10/2014 |
| DE | 10 2013 215 572 A1 | 2/2015 |
| DE | 10 2013 225 884 A1 | 6/2015 |
| DE | 10 2014 217 908 A1 | 3/2016 |
| EP | 1 909 368 A2 | 4/2008 |
| WO | WO 2016/091300 A1 | 6/2016 |

OTHER PUBLICATIONS

German-language Written Opinion (PCT/ISA/237) issued in PCT Application No. PCT/EP2017/069202 dated Oct. 9, 2017 (seven pages).

\* cited by examiner

CIRCUIT FOR PRE-CHARGING AN INTERMEDIATE CIRCUIT, AND ELECTRIC SYSTEM

BACKGROUND AND SUMMARY OF THE INVENTION

The invention relates to a circuit for pre-charging an intermediate circuit and to an electrical system.

DE 10 2014 217 908 A1 discloses a circuit for pre-charging an intermediate circuit or an intermediate circuit capacitor. Circuits of this kind are provided, when the electrical system comprising the intermediate circuit is switched on, to initially pre-charge the intermediate circuit to a voltage close to an operating voltage of a high-voltage battery that feeds the intermediate circuit after the pre-charging. If such pre-charging were to be omitted, an impermissibly high charging current could flow when the high-voltage battery is connected to the intermediate circuit.

The invention is based on the object of providing a circuit for pre-charging an intermediate circuit and to an electrical system, which make it possible to pre-charge the intermediate circuit reliably.

The invention achieves this object by way of a circuit for pre-charging an intermediate circuit and an electrical system in accordance with embodiments of the invention.

The circuit is configured to pre-charge an intermediate circuit, in particular one or more intermediate circuit capacitors of the intermediate circuit, to a pre-charging voltage. The pre-charging voltage may depend on an operating voltage of an electrical energy store, for example in the form of a battery, which feeds the intermediate circuit after the pre-charging. The pre-charging voltage may, for example, be equal to the operating voltage or be lower than the operating voltage by a prescribed difference value (typically a few volts).

In addition to one or more intermediate circuit capacitors, the intermediate circuit has a positive branch and a negative branch. A positive intermediate circuit potential is typically present at the positive branch and a negative intermediate circuit potential is typically present at the negative branch.

The circuit for pre-charging an intermediate circuit has a first controllable energy source and a second controllable energy source. The first and the second energy source can change or suitably adjust an electrical energy or electrical power output at the respective output thereof in an actuation-dependent manner. The first energy source and the second energy source are looped in at their respective outputs in series between the positive branch and the negative branch.

The circuit for pre-charging an intermediate circuit also has an interference suppression unit, which is looped in between a connecting node of the output of the first energy source and of the output of the second energy source and a reference-ground potential, in particular PE (protective earth). The interference suppression unit is configured to reduce line-based and/or radiated interferences. The interference suppression unit can form or have a measurement impedance and have, for example, a resistor and a capacitor connected in parallel therewith.

The circuit for pre-charging an intermediate circuit also has a control device, for example in the form of a microprocessor or a digital signal processor. The control device is connected in a signal-transmitting manner to the first energy source and the second energy source and is configured to actuate the first energy source and the second energy source to generate an output signal pattern, for example in the form of an output voltage pattern, in such a way that said energy sources pre-charge the intermediate circuit.

In accordance with one embodiment, the first energy source is a voltage source, a current source or a combined voltage/current source. Accordingly, the second energy source may be a voltage source, a current source or a combined voltage/current source.

The first energy source and/or the second energy source can draw the energy from a low-voltage energy store or low-voltage generator in order to generate the respective output signal pattern or to pre-charge the intermediate circuit.

In accordance with one embodiment, the first energy source has a DC-isolating DC/DC converter, which is fed, for example, from a low-voltage supply system, for example from a battery. Accordingly, the second energy source can have a DC-isolating DC/DC converter, which is fed, for example, from the low-voltage supply system.

In accordance with one embodiment, the control device is configured to actuate the first energy source and the second energy source independently of one another.

In accordance with one embodiment, the circuit has a measurement device, which is configured to measure a voltage between a middle potential and a reference-ground potential, in particular PE, and/or to measure a voltage between a potential present at the positive branch and the reference-ground potential, in particular PE, and/or to measure a voltage between a potential present at the negative branch and the reference-ground potential, in particular PE, and/or to measure a voltage dropped at the interference suppression unit. The measurement device can furthermore be configured to measure currents within the circuit and/or within further components.

In accordance with one embodiment, the measurement device is configured to detect a malfunction of the first energy source and/or of the second energy source based on the measured voltages and/or currents and, in the event of a detected malfunction of one of the two energy sources, to activate the respectively fault-free energy source in order to pre-charge the intermediate circuit.

In accordance with one embodiment, the control device is configured to actuate the first energy source and the second energy source in alternation to generate the output voltage signal pattern as an output voltage test pattern. To this end, the control device can be configured, for example, during first time intervals, to actuate the first energy source to generate an output voltage and to deactivate the second energy source so that it does not generate an output voltage and, during second time intervals, to actuate the second energy source to generate an output voltage and to deactivate the first energy source so that it does not generate an output voltage. The first time intervals and the second time intervals then follow one another in alternation. The output voltage test pattern can also serve, for example, to check the correct functioning of the measurement device.

In accordance with one embodiment, the control device is configured to detect, during the generation of the output voltage test pattern, based on the voltage/current or voltages/currents measured by means of the measurement device, both symmetrical and asymmetrical insulation faults in the intermediate circuit, in particular to locate insulation faults by means of different switch-on conditions of the two energy sources.

The electrical system according to the invention has an above-described circuit for pre-charging an intermediate circuit.

The electrical system also has one or more intermediate circuit capacitors, which is/are looped in between the positive branch and the negative branch of the intermediate circuit.

The circuit for pre-charging an intermediate circuit is configured to charge the intermediate circuit capacitor or capacitors up to a prescribed pre-charging voltage, for example after the electrical system has been switched on. After the intermediate circuit capacitor has been charged up to the pre-charging voltage, the intermediate circuit can be coupled, for example, to a battery.

In accordance with one embodiment, the current converter has a number of actuatable electrical switching elements, for example in the form of semiconductor switches, such as FETs or IGBTs, for example, wherein the control device is configured to actuate the electrical switching elements. The measurement device is configured to measure currents and voltages of the current converter (and possibly also of the circuit itself) in different switch-on states of the first energy source and of the second energy source and in different switching states of the switching elements and to evaluate same in such a way that possible insulation faults in the entire electrical system can be detected and located.

The electrical system can also have an electrical energy store, in particular in the form of a battery, which is configured to supply electrical energy to the intermediate circuit after the pre-charging.

BRIEF DESCRIPTION OF THE DRAWINGS

The invention is described in detail below with reference to the drawings. In the figures.

DETAILED DESCRIPTION OF THE DRAWINGS

Figure 1:
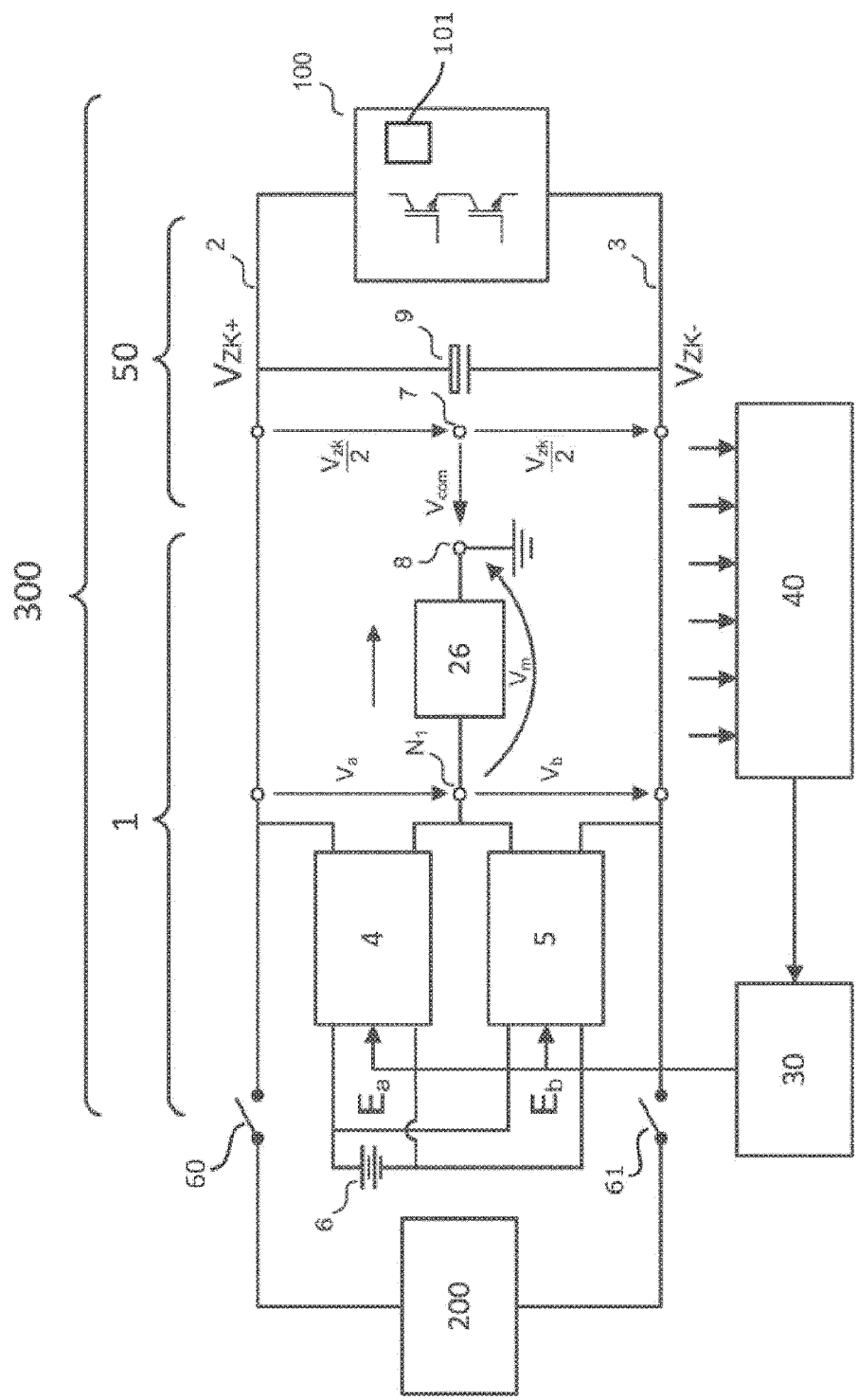
FIG. 1 shows a schematic block diagram of an electrical system according to the invention.

FIG. 1 shows a schematic block diagram of an electrical system 300 according to the invention.

The electrical system 300 has a circuit 1 for pre-charging an intermediate circuit capacitor 9 of an intermediate circuit 50. The intermediate circuit capacitor 9 is looped in between a positive branch 2 and a negative branch 3 of the intermediate circuit 50. A positive intermediate circuit potential Vzk+ is applied to the positive branch 2 and a negative intermediate circuit potential Vzk− is applied to the negative branch 3. The circuit 1 is provided to charge the intermediate circuit capacitor 9 up to a defined pre-charging voltage.

The electrical system 300 also has a current converter 100, for example in the form of an AC/DC, DC/DC or DC/AC converter, which is fed from the intermediate circuit 50.

The electrical system 300 also has an electrical energy store 200, for example in the form of a battery. After the intermediate circuit 50 has been pre-charged, the electrical energy store 200 feeds the intermediate circuit 50 directly by virtue of it being electrically conductively connected directly to the intermediate circuit 50, for example. To this end, actuatable switching means 60 and 61 are provided, which isolate the electrical energy store 200 from the intermediate circuit 50 during the pre-charging and electrically connect the electrical energy store 200 to the intermediate circuit 50 after the pre-charging.

The circuit 1 for pre-charging the intermediate circuit 50 or the intermediate circuit capacitor 2 has a first controllable energy source 4, for example having a DC-isolating DC/DC converter, and a second controllable energy source 5, for example likewise having a DC-isolating DC/DC converter.

The first energy source 4 and the second energy source 5 are looped in, on the output side, in series between the positive branch 2 and the negative branch 3. The first energy source 4 and the second energy source 5 are electrically connected to one another, on the output side, at a connecting node N1. The first energy source 4 and the second energy source 5 are each supplied with power, on the input side, by means of a pre-charging voltage supply 6, which may be embodied, for example, as an energy store in the form of a battery. The first energy source 4 generates at the output thereof an output voltage Va and the second energy source 5 generates at the output thereof an output voltage Vb.

An interference suppression unit 26 is looped in between the connecting node N1 and a reference-ground potential in the form of PE (protective earth). The interference suppression unit 26 has a known measurement impedance, which can also be used for insulation measurement.

The circuit 1 for pre-charging the intermediate circuit 50 or the electrical system 300 also has a control device 30 in the form of a digital signal processor. The control device 30 controls, among other things, the energy sources 4 and 5 in order to pre-charge the intermediate circuit 50 in a pre-charging phase, which is described below with reference to FIG. 3 and FIG. 4.

The current converter 100 has a number of electrical switching elements 101, wherein the control device 30 is configured to actuate the electrical switching elements 101. For reasons of simpler presentability, only one single switching element 101 is schematically illustrated. It goes without saying that the current converter 100 typically has a plurality of such switching elements 101. Reference is otherwise also made to the specialist literature regarding current converters.

The circuit 1 for pre-charging an intermediate circuit 50 or the electrical system 300 also has a measurement device 40, which is configured to measure one or more voltages and/or currents that are used in the detection and location of insulation faults.

The measurement device 40 can measure, for example, the following voltages: a voltage Vcom between a middle potential and a reference-ground potential, in particular PE, and/or a voltage between a potential present at the positive branch 2 and the reference-ground potential, and/or a voltage between a potential present at the negative branch 3 and the reference-ground potential, and/or a voltage Vm dropped at the interference suppression unit 26.

In addition, the measurement device 40 can detect the following measurement variables: voltages and currents in the current converter 100 in different switch-on states of the first energy source 4 and of the second energy source 5 and different switching states of the switching elements 101. The measurement device 40 can evaluate the measured voltages/currents in such a way that possible insulation faults in the entire electrical system 300 can be detected and located. For the fundamentals of evaluating voltages and currents for detecting and locating insulation faults, reference is also made to the relevant specialist literature.

Figure 2:
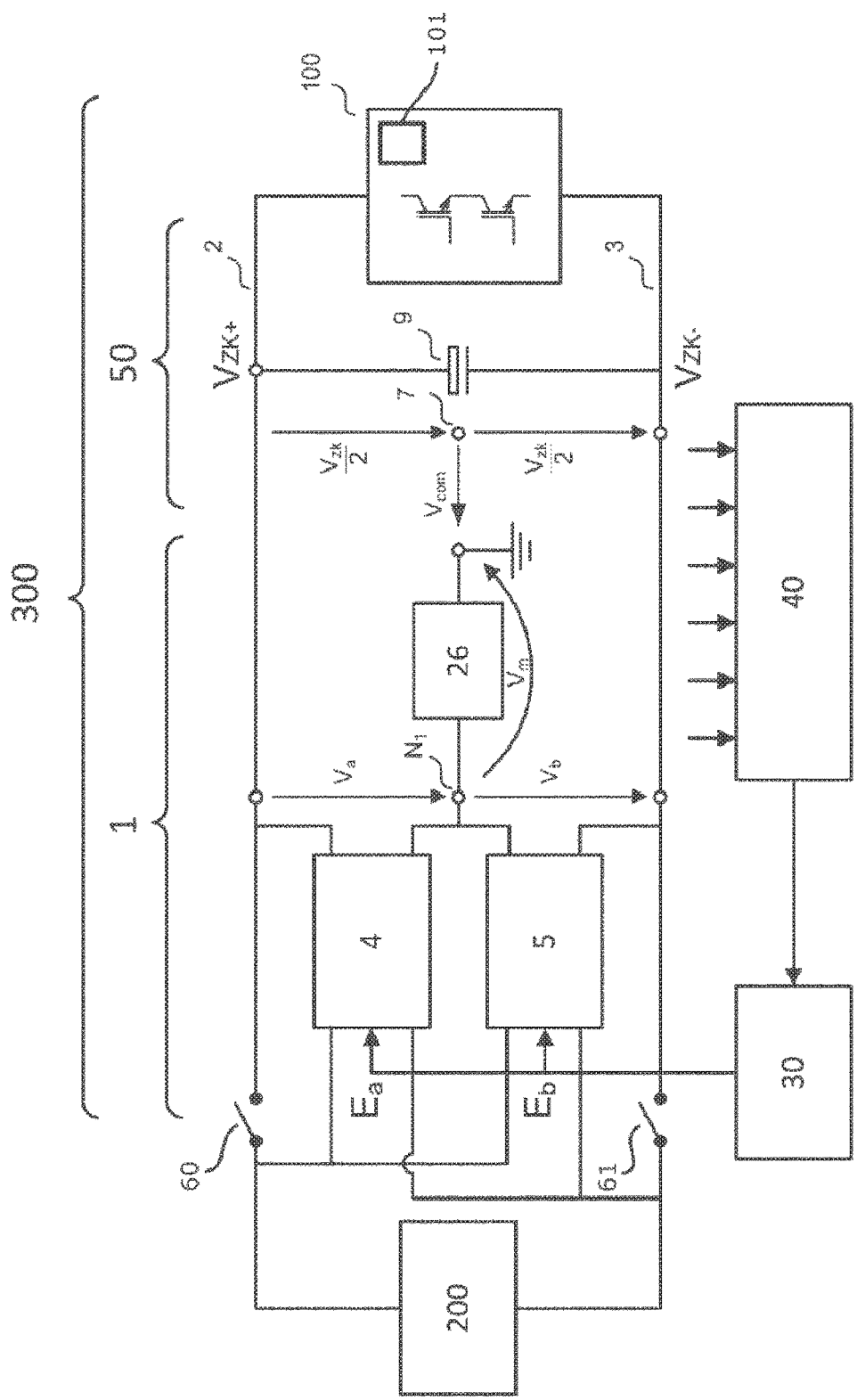
FIG. 2 shows a schematic block diagram of a further embodiment of an electrical system according to the invention.

FIG. 2 shows a block diagram of a further embodiment of an electrical system 300. Unlike in the embodiment shown in FIG. 1, the two energy sources 4 and 5 are not supplied with power from the pre-charging voltage supply 6 during the pre-charging, but instead are supplied with power from the energy store 200.

Figure 3:
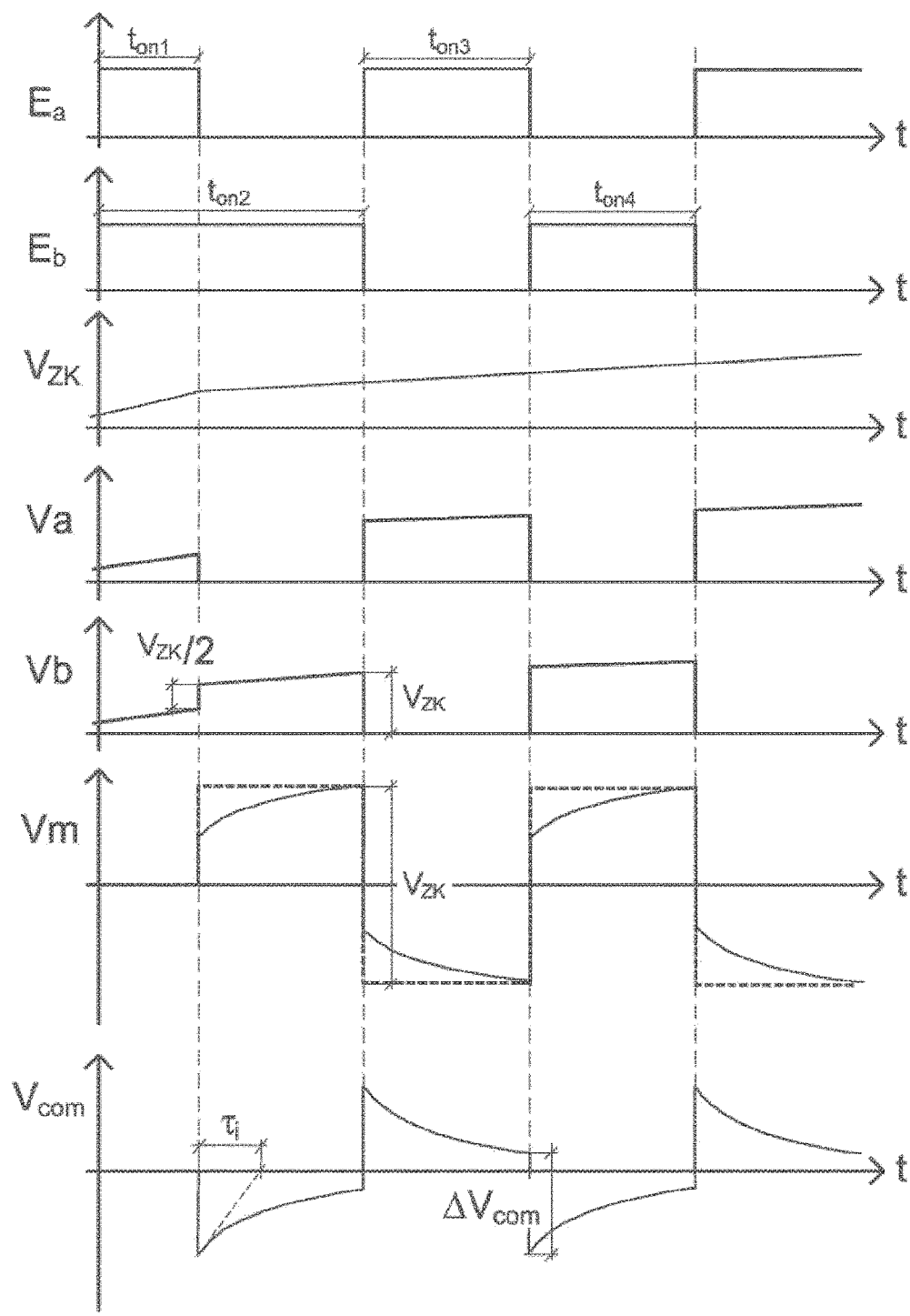
FIG. 3 shows signal profiles over time of the electrical systems shown in FIG. 1 and FIG. 2 in the case of symmetrical insulation resistances and FIG. 4 shows signal profiles over time of the electrical systems shown in FIG. 1 and FIG. 2 in the case of asymmetrical insulation resistances.

FIG. 3 shows signal profiles over time of the circuit 1 shown in FIG. 1 and FIG. 2 in the case of symmetrical insulation resistances. In this case, the references are as follows:

Ea an actuation signal of the first energy source 4
Eb an actuation signal of the second energy source 5
Vzk an intermediate circuit voltage across the intermediate circuit capacitor 9
Va the output voltage of the energy source 4
Vb the output voltage of the energy source 5
Vm the voltage dropped at the measurement impedance of the interference suppression unit
Vcom a voltage between a middle potential and PE With reference to FIG. 3, the control device 30 generates an output voltage pattern during a period ton1 by generating the actuation signals Ea and Eb of the energy sources 4 and 5 in such a way that, in accordance with the output voltage pattern, both energy sources or DC/DC converters 4 and 5 operate in parallel and output substantially identical voltages Va and Vb, respectively.

As shown in FIG. 3, the intermediate circuit voltage Vzk increases continuously, that is to say the intermediate circuit 50 or the intermediate circuit capacitor 9 thereof is pre-charged.

After the period ton1 has elapsed, detection of insulation faults begins in addition to pre-charging of the intermediate circuit 50. To this end, the output voltage pattern is generated as an output voltage test pattern.

Firstly, for this purpose, the actuation signal Ea of the first energy source 4 is changed (that is to say deactivated) in such a way that the first energy source 4 is turned off.

After a period ton2 has elapsed, the control device 30 activates the control signal Ea and deactivates the control signal Eb. Based on that described above, a signal inversion now takes place.

The two energy sources 4 and 5 are now turned on and turned off in alternation, see ton3 and ton4, for example, to generate the output voltage test pattern until the desired insulation resistances are identified and located.

The two energy sources 4 and 5 consequently perform a double function, specifically, on the one hand, they bring about pre-charging of the intermediate circuit 50 and, on the other hand, they make it possible, together with the interference suppression unit 26, to detect and to locate insulation faults in the intermediate circuit 50.

To measure the insulation resistances, it should be assumed that the impedance of the interference suppression unit 26 is known.

To calculate a possible insulation fault, it is possible to use a state and parameter estimation by means of an extended Kalman filter. Of course, other calculation models and calculation methods are also possible. In this respect, reference is also made to the relevant specialist literature.

Figure 4:
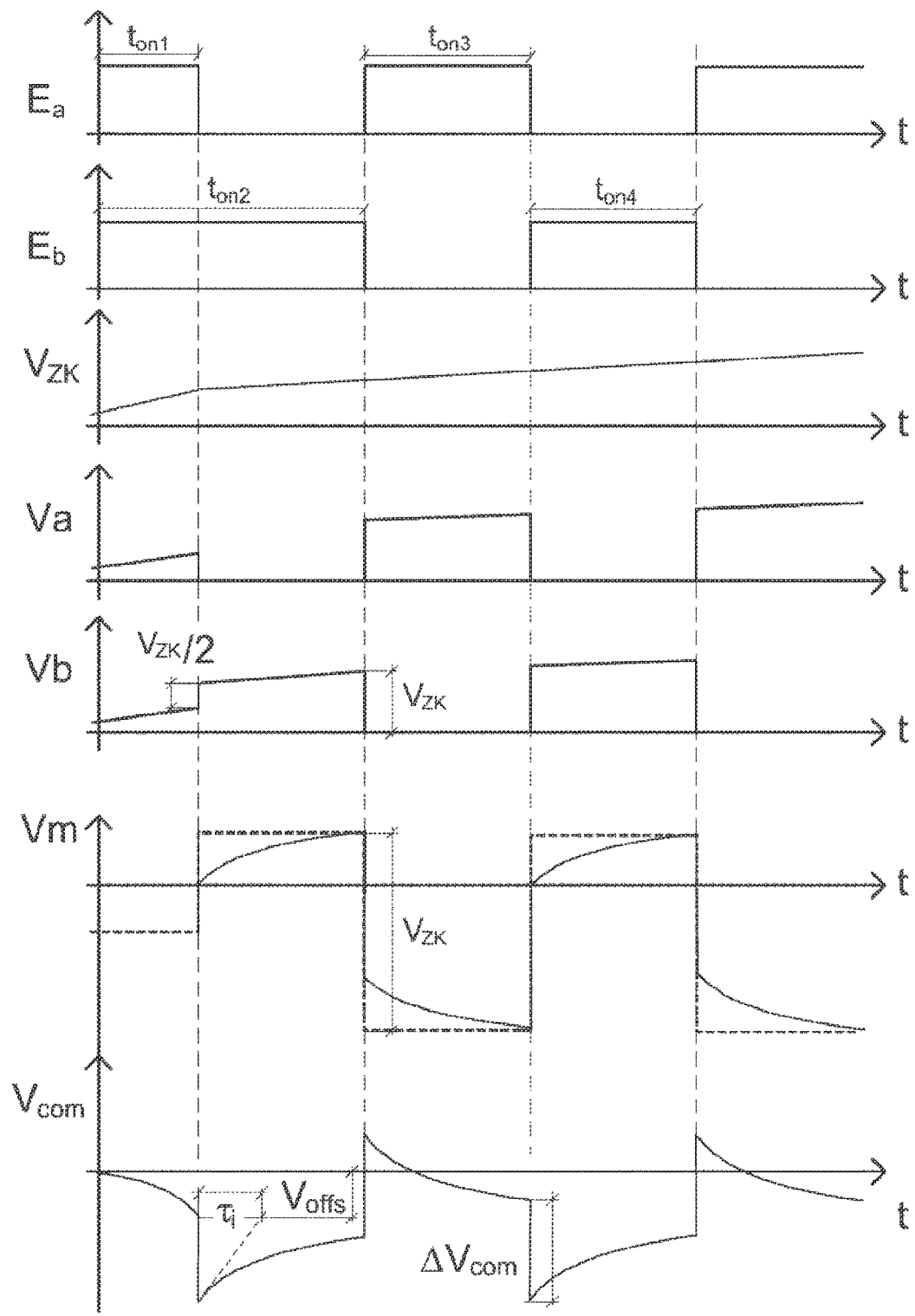

FIG. 4 shows the signal profiles over time in the case of asymmetrical insulation resistances.

What is claimed is:

1. A circuit for pre-charging an intermediate circuit, wherein the intermediate circuit has a positive branch and a negative branch, comprising:
    a first controllable energy source,
    a second controllable energy source, wherein the first controllable energy source and the second controllable energy source are looped in, on the output side, in series between the positive branch and the negative branch,
    an interference suppression unit, wherein the interference suppression unit is looped in between a connecting node of the output of the first controllable energy source and of the output of the second controllable energy source and a reference-ground potential, and
    a control device,
        which is connected in a signal-transmitting manner to the first energy source and the second energy source, and
        which is configured to actuate the first energy source and the second energy source to generate an output signal pattern in order to pre-charge the intermediate circuit.

2. The circuit for pre-charging an intermediate circuit as claimed in claim 1, wherein
    the first energy source and/or the second energy source is/are a voltage source, a current source or a combined voltage/current source.

3. The circuit for pre-charging an intermediate circuit as claimed in claim 1, wherein
    the first energy source has a DC-isolating DC/DC converter, and/or
    the second energy source has a DC-isolating DC/DC converter.

4. The circuit for pre-charging an intermediate circuit as claimed in claim 1, wherein
    the control device is configured to actuate the first energy source and the second energy source independently of one another.

5. The circuit for pre-charging an intermediate circuit as claimed in claim 1, further comprising:
    a measurement device, which is configured to measure at least one of: (i) a voltage between a middle potential and the reference-ground potential, (ii) a voltage between a potential present at the positive branch and the reference-ground potential, (iii) a voltage between a potential present at the negative branch and the reference-ground potential, and (iv) a voltage dropped at the interference suppression unit.

6. The circuit for pre-charging an intermediate circuit as claimed in claim 5, wherein
    the measurement device is configured to detect a malfunction of the first energy source and/or of the second energy source and, in an event of a detected malfunction of one of the two energy sources, to activate the respectively fault-free energy source in order to pre-charge the intermediate circuit.

7. The circuit for pre-charging an intermediate circuit as claimed in claim 1, wherein
    the control device is configured to actuate the first energy source and the second energy source in alternation to generate an output voltage test pattern.

8. The circuit for pre-charging an intermediate circuit as claimed in claim 5, wherein
    the control device is configured to detect, based on the voltage or voltages measured by the measurement device, both symmetrical and asymmetrical insulation faults in the intermediate circuit, wherein insulation faults are located by different switch-on conditions of the two energy sources.

9. An electrical system, comprising:
    a circuit for pre-charging an intermediate circuit as claimed in claim 1,
    an intermediate circuit capacitor, which is looped in between the positive branch and the negative branch of the intermediate circuit, wherein the circuit for pre-charging an intermediate circuit is configured to charge the intermediate circuit capacitor up to a pre-charging voltage, and a current converter, which is fed from the intermediate circuit.

10. The electrical system as claimed in claim 9, wherein the current converter has a number of electrical switching elements, wherein the control device is configured to actuate the electrical switching elements, wherein the measurement device is configured to measure currents and voltages of the current converter in different switch-on states of the first energy source, of the second energy source and different switching states of the switching elements and to evaluate same in such a way that possible insulation faults in the entire electrical system are detectable and locatable.

11. The electrical system as claimed in claim 9, wherein the current converter is an AC/DC, DC/DC or DC/AC converter.

12. The circuit for pre-charging an intermediate circuit as claimed in claim 2, wherein the first energy source has a DC-isolating DC/DC converter, and/or the second energy source has a DC-isolating DC/DC converter.

13. The circuit for pre-charging an intermediate circuit as claimed in claim 6, wherein the control device is configured to detect, based on the voltage or voltages measured by the measurement device, both symmetrical and asymmetrical insulation faults in the intermediate circuit, wherein insulation faults are located by different switch-on conditions of the two energy sources.

14. The circuit for pre-charging an intermediate circuit as claimed in claim 7, wherein the control device is configured to detect, based on the voltage or voltages measured by the measurement device, both symmetrical and asymmetrical insulation faults in the intermediate circuit, wherein insulation faults are located by different switch-on conditions of the two energy sources.

\* \* \* \* \*